Jan. 19, 1965  A. L. TOWSON  3,165,876
BEAN PICKER
Filed Jan. 16, 1963  5 Sheets-Sheet 1

INVENTOR.
Arthur Lee Towson
BY
Popp and Sommer
ATTORNEYS.

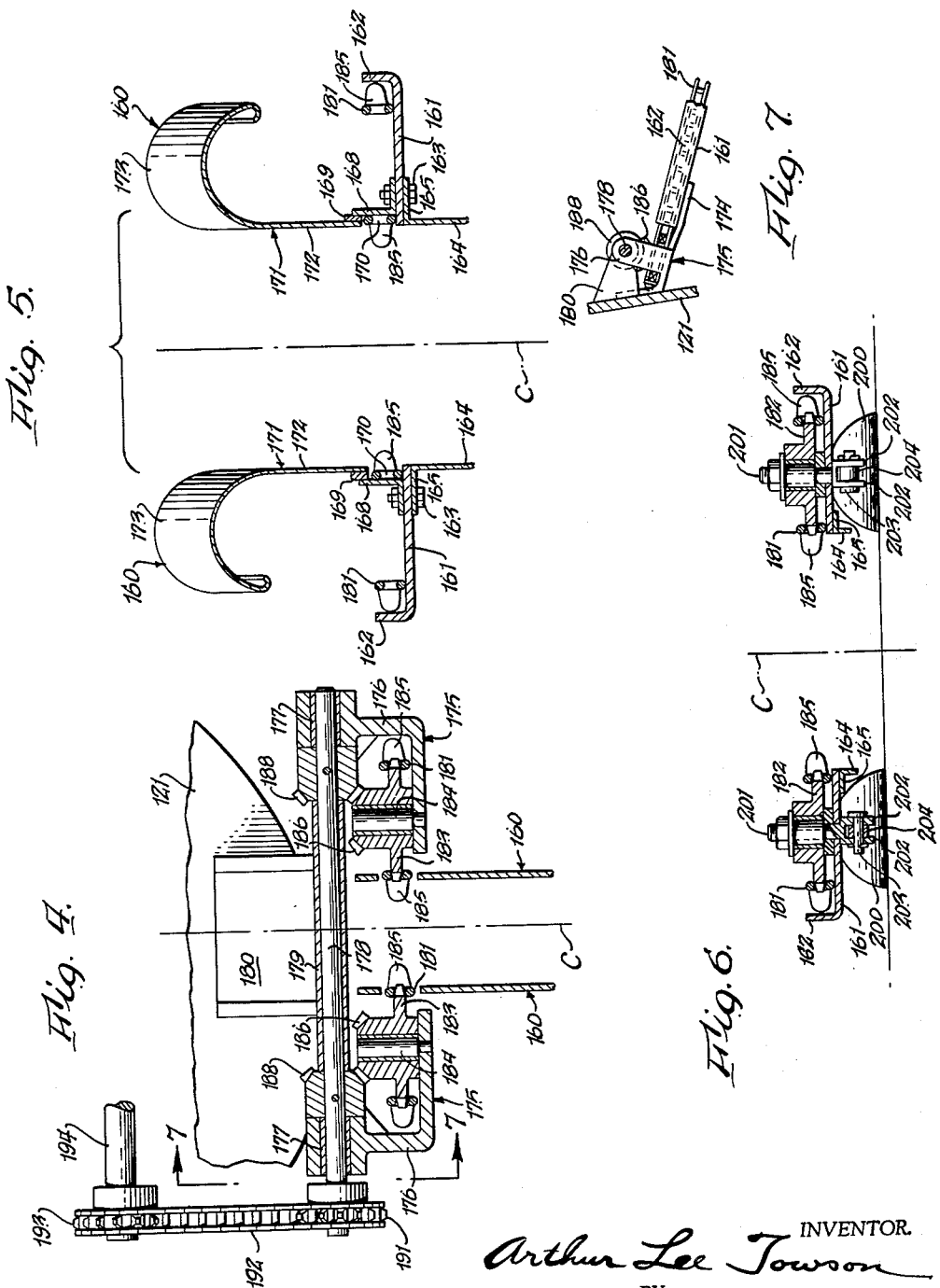

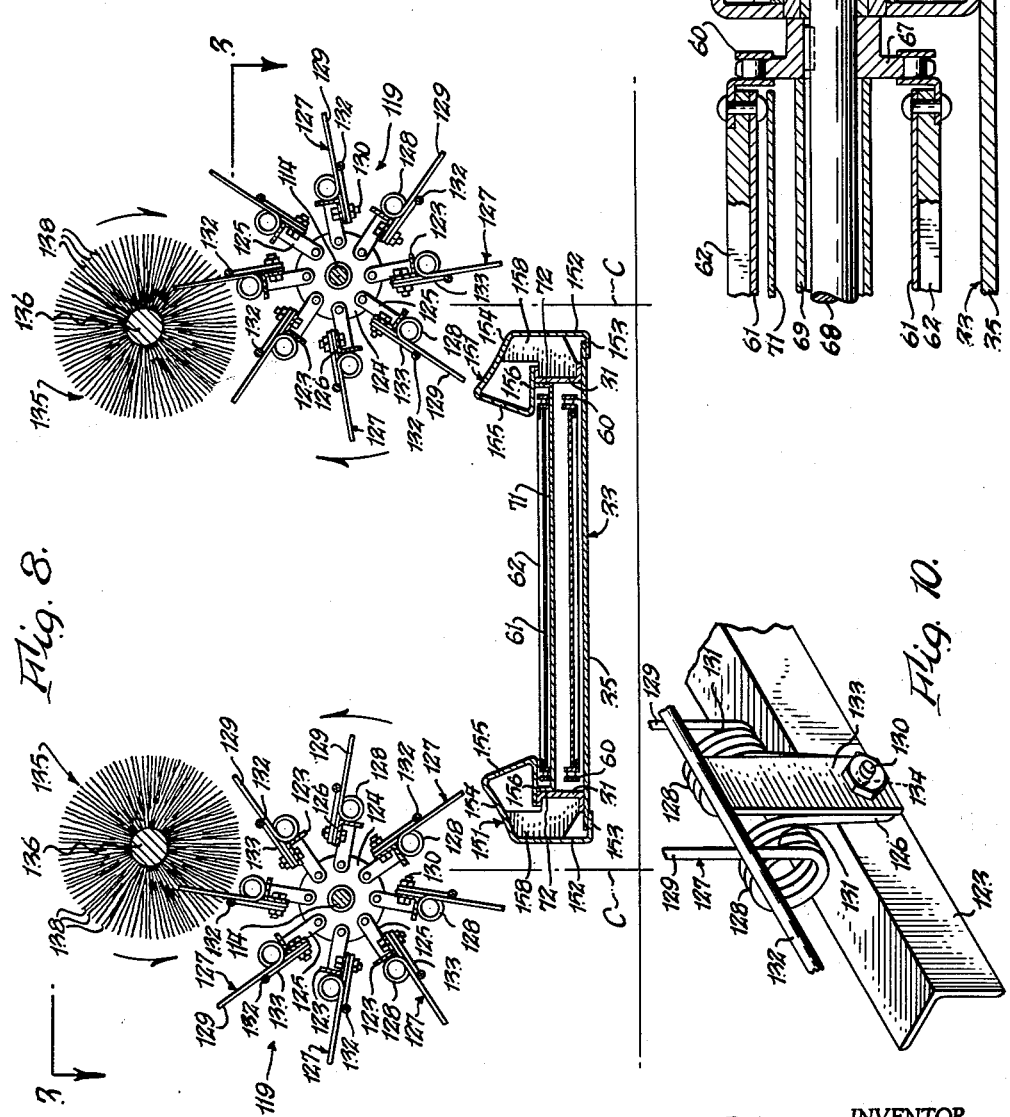

United States Patent Office 3,165,876
Patented Jan. 19, 1965

3,165,876
BEAN PICKER
Arthur Lee Towson, Lewiston, N.Y., assignor to Chisholm-Ryder Company, Inc., Niagara Falls, N.Y., a corporation of New York
Filed Jan. 16, 1963, Ser. No. 251,827
4 Claims. (Cl. 56—130)

This invention relates to a bean picker and more particularly to a machine for harvesting snap or string beans although features of the invention can also be advantageously employed in a machine for picking dry or mature bean pods and seeds from ripe bushes.

An important object of the present invention is to provide a bean picker which moves through a field of bean plants and which harvests string or snap beans from the bushes with a minimum loss of the bean pods and with a minimum of breaking and bruising of the pods.

Another object is to provide such a bean picker which is particularly effective on cold mornings in avoiding breaking the bean pods, the pods being particularly susceptible to breakage on cold mornings.

Another object of the present invention is to provide such a harvester which is particularly effective in picking baby lima bean pods and Fordhook bean pods which fly around like pieces of paper during the threshing operation and have proved to be a particular problem with mobile harvesters. Such baby lima and Fordhook bean pods are subsequently threshed in a viner to remove the small baby lima and Fordhook beans in seed form.

Another particular object of the present invention is to provide simple and effective picking tines which yield on encountering immobile objects but which are protected so that they do not clog up with vines or leaves but retain full effectiveness in their threshing operation.

Another object of the present invention is to provide such a bean picker which retains the bean plants near the ends of the picking tines both to avoid entanglement of the bean plants with the bases of the tines and also to form the bean plants into a mat or mass of uniform thickness and density for optimum bean pod recovery.

Another particular object of the present invention is to provide such a harvester which maintains itself in a clean condition and which can readily be washed down.

General objects are to provide such a harvester which is of high capacity, does not require a high degree of skill to operate and which is rugged in construction and not subject to breakdown or other interference in its operation.

Other objects and advantages of the invention will be apparent from the following description and drawings in which:

FIG. 4 is an enlarged vertical section taken generally along line 4—4, FIG. 1 and showing the drive to the gathering chains.

FIG. 5 is an enlarged vertical section taken generally along line 5—5, FIG. 2 and showing the gathering apron and chains in section.

FIG. 6 is an enlarged vertical section taken along line 6—6, FIG. 2 and showing the foremost sprocket wheels for the gathering chains and also the skids at the forward end of each gathering apron.

FIG. 7 is a diminutive vertical section taken on line 7—7, FIG. 4.

FIG. 8 is a vertical section taken along line 8—8, FIG. 2 and showing the reels and main endless slatted conveyer belt in section.

FIG. 9 is an enlarged vertical section taken along line 9—9, FIG. 2 and showing, in section, the sprocket for the forward end of the main endless slatted conveyer belt for the harvester.

FIG. 10 is a perspective view of a picking tine showing a rod functioning therewith in smoothing the bushes into a mat and preventing branches thereof from being caught in the crotches of the tines.

Figure 1:
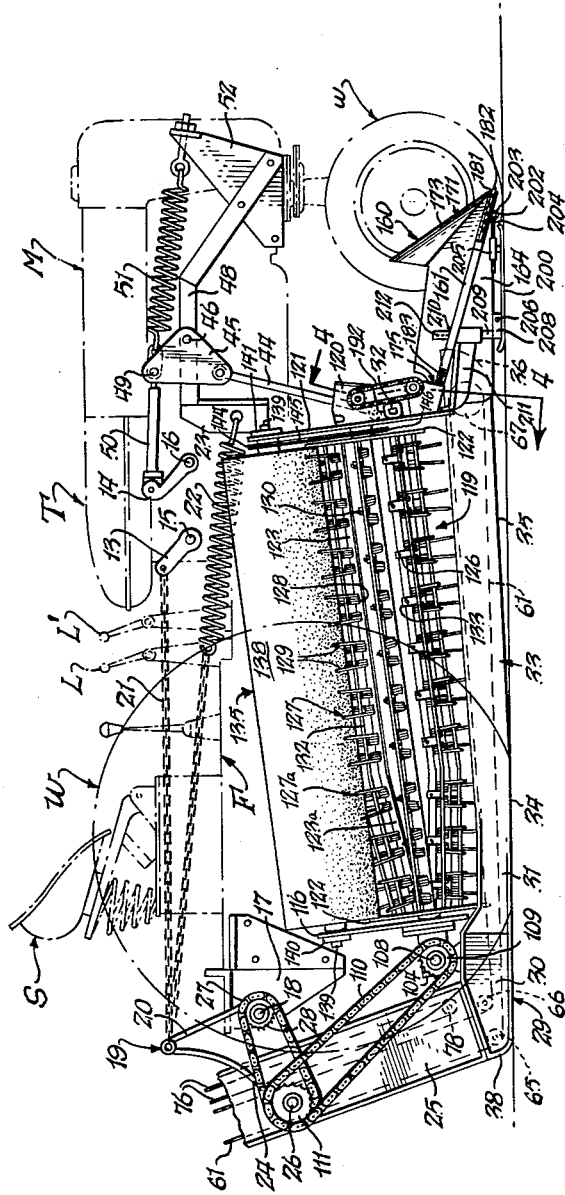
FIG. 1 is a fragmentary side elevational view of a bean harvester embodying the present invention and showing the same as applied to a conventional farm tractor which is shown in dot-dash lines.

The present invention is illustrated in conjunction with the form of bean picker forming the subject of the Ward Patent No. 2,675,663 dated April 20, 1954, to which reference is made for features such as leaf and stem separation and bagging not illustrated in this application.

For convenience in understanding the invention, the center lines of the two rows of bean plants to be harvested are designated by the letter C. The bean harvester is also propelled along these rows of bean plants by a conventional farm tractor T shown by dot-dash lines in FIGS. 1 and 3. This tractor is shown as having the conventional frame F, rear driving wheels W, front steering wheels w, motor M and seat S. Particularly associated with the present invention are two manual hydraulic control levers L and L' which control, respectively, the movemnt of a pair of lifting arms 13 and 14 on opposite sides of the tractor and each of which is fast to a corresponding cross shaft 15, 16 which is journalled in the tractor frame F. The upper free end of each lifting arm 13 is apertured to connect with a lifting chain and the upper free end of each lifting arm 14 is apertured to connect with a lifting push rod as hereinafter described. Also, particularly associated with the present invention is a power take-off 17 (FIG. 1), secured to the tractor frame F by suitable brackets and carrying and driving a transverse drive shaft 18 from which power for operation of the harvester is derived.

At each side of the tractor a lifting bell crank lever 19 is mounted on the housing for the power take-off 17 concentric with a shaft 18, one arm 20 of each bell crank lever projecting upwardly and being apertured to receive an intermediate part of a pull chain 21 one end of which is connected to the upper free end of the corresponding hydraulic lifting arm 13 and the other end of which is secured through a helical tension spring 22 to a bracket 23 secured to the corresponding side of the frame F of the tractor.

Each bell crank lever 19 has a second arm 24 projecting rearwardly with reference to the line of movement of the harvester and the free ends of these arms 24 are pivotally secured to the opposite sides of an elevator housing 25 concentric with a transverse jack shaft 26 journalled in this housing. The elevator mechanism contained within this housing 25 forms no part of the present invention and hence the upper part of this elevator housing and elevator mechanism therein is not illustrated. This jack shaft 26 is driven from the power take-off shaft 18 by a chain and sprocket drive 27, 28 and the other powered components are driven from this jack shaft as hereinafter described.

Figure 2:
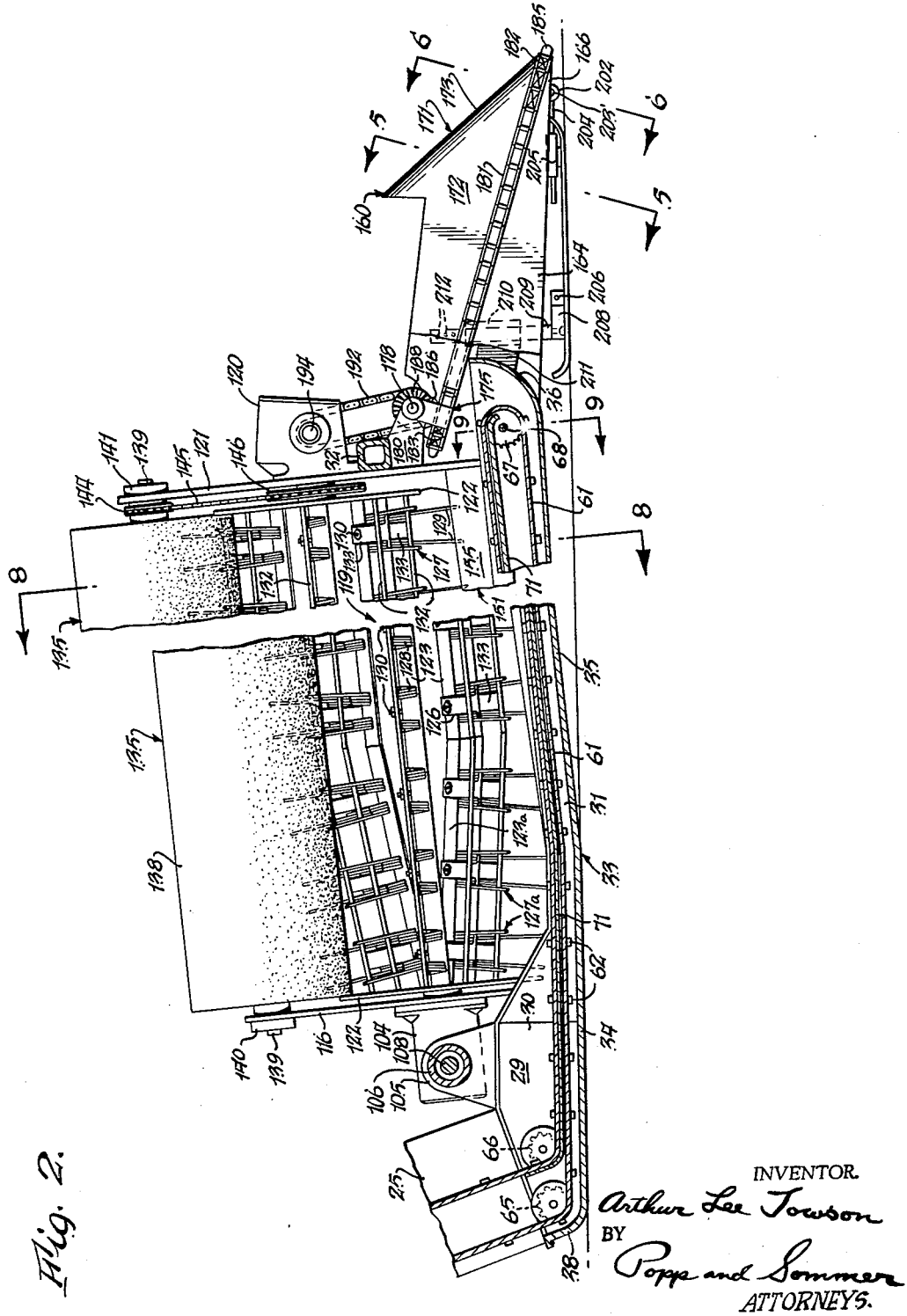
FIG. 2 is a vertical longitudinal section taken generally on line 2—2, FIG. 3 and showing part of the mechanism broken away.
Figure 3:
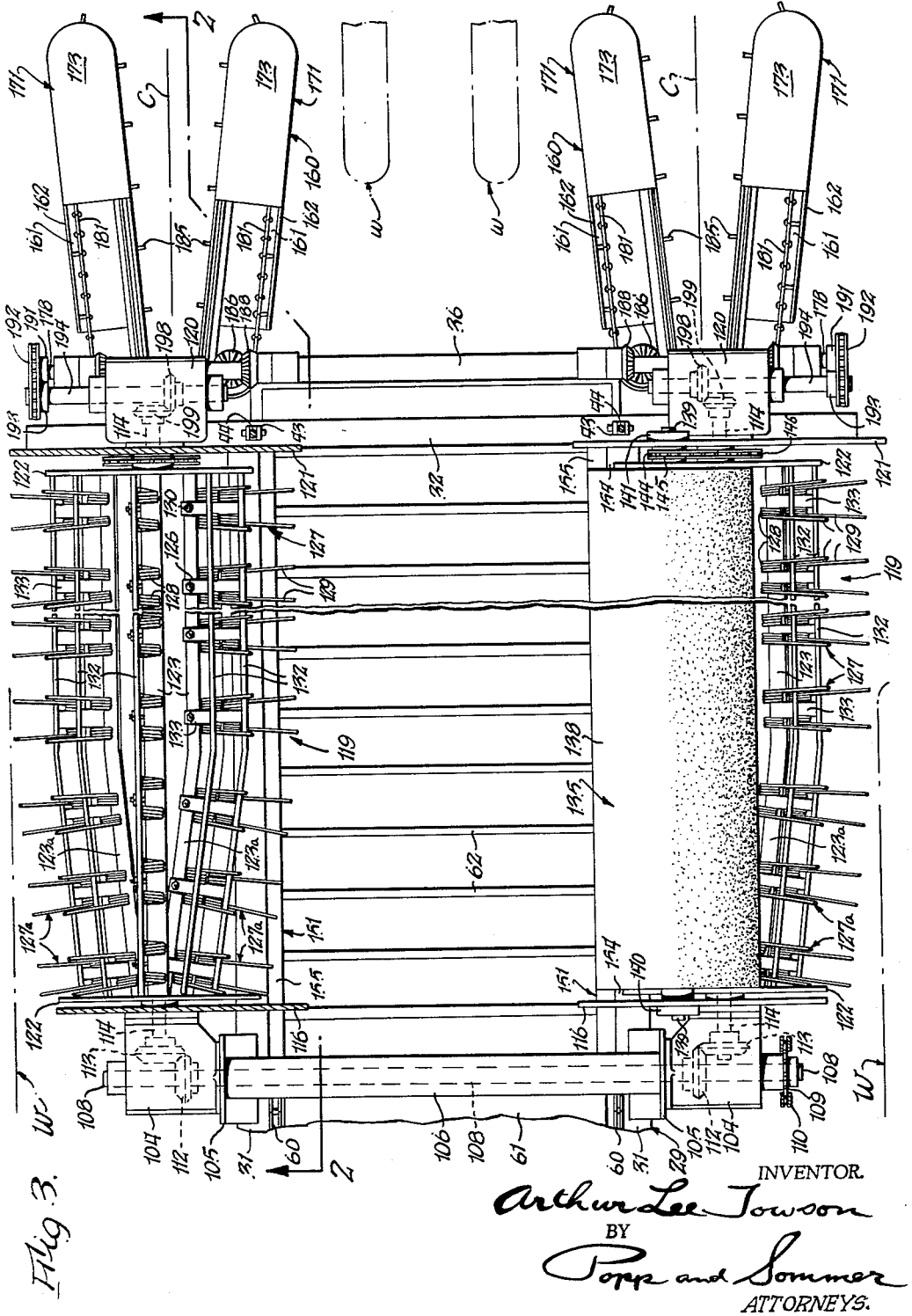
FIG. 3 is a fragmentary horizontal section taken generally on line 3—3, FIG. 8, with parts broken away.

The elevator housing 25, of which the lower part only is illustrated, forms a part of the adjustable frame of the harvester and is rectangular in cross section to enclose the upwardly extending stretches of an endless belt conveyer. The lower end of this housing 25 is fast to a base 29, the vertical side walls 30 of which are fast to channels 31 which project forwardly from these side walls 30 and are arranged on opposite sides of the harvester. As shown in FIGS. 1–3, the front ends of the channels 31 are rigidly connected by a bar 32 which is preferably tubular and square in cross section and which forms the front cross bar of the harvester frame. The channels or side frame bars 31 are also connected by a metal bottom plate 33 which, as best shown in FIG. 8, is secured to the undersides of the side bars 31 and projects laterally a short distance therefrom. This bottom plate 33 travels close to the ground, its rear end 34, as best shown in FIG. 2, being arranged substantially parallel with the ground while its forward end 35 inclines forwardly and upwardly at a slight angle. Also, as shown in FIG. 2, the extreme forward end 36 curves upwardly to provide a scow-like prow and the rear end 34 thereof extends under the base 29 of the elevator housing and curves upwardly as indicated at 38, to join the rear wall of the housing.

As best shown in FIG. 3, the tubular cross bar 32 is provided near its opposite ends with a pair of upstanding ears 43, to which is pivotally connected the lower end of a lifting link 44. As best shown in FIG. 1, the upper end of each of the links 44 connects with a triangular plate 45 which forms in effect another bell crank lever which is pivoted at 46 to a bracket 48 secured to the tractor frame F. The third or upper pivot 49 of each triangular plate 45 is connected by a push rod or link 50 with the free end of the hydraulically actuated lifting arm 14. The pivot 49 also connects with a helical tension spring 51, the forward end of which is anchored to a bracket 52 carried by the frame F of the tractor.

The hand lever L hydraulically controls the arms 13, and it will be seen that when these arms 13 are actuated to rotate clockwise, as viewed in FIG. 1, tension is imposed on the chains 21 to rotate the bell crank levers 19 clockwise and lift their lower arms 24. Since each lower arm 24 is pivotally connected with the rear end of the frame of the harvester, this serves to lift the rear end of the harvester frame to an elevation to suit the condition of the bean plants being picked. At the same time, since the drive chain 27 passes around sprockets concentric with the shafts 18 and 26 supporting and supported by respectively, the two bell crank levers 19, the power drive from the tractor T to the harvester is not interfered with by such adjustment of the rear end of the harvester frame.

The hand lever L' hydraulically controls the arms 14, as viewed in FIG. 1, and pushes on the rods 50 to rotate the triangular plates 45 clockwise about their pivots 46, thereby lifting the rods 44 which support the front tubular cross bar 32 of the harvester frame, the front end of the harvester being thereby elevated to suit the condition of the bean plants being picked. It will also be noted that each pair of helical tension springs 22 and 51 serve to yieldingly support the corresponding ends of the harvester frame.

The threshed pods, together with leaves, stems and trash, are received and conveyed to and up the elevator housing 25 by an endless conveyer shown as being in the form of drive chains 60 (FIG. 9) severally fast to each side edge of an endless belt 61 preferably made of rubberized cloth and provided on its working face with a succession of transverse slats 62. The drive chains 60 along the opposite edges of the conveyer belt 61 can be of any suitable form and are preferably secured to the opposite ends of the slats 62 in any suitable manner, such as by the rivets shown in FIG. 9. This conveyer belt 61 receives the threshed bean pods, as well as leaves and stems that are removed from the bean plants, and delivers them to and elevates them through the elevator housing 25 for further processing. For this purpose, the conveyer chains are shown as travelling around two pairs of idler sprockets 65 and 66 (FIG. 2) journalled in the base 29 of the elevator housing 25 and which provide an upwardly and downwardly moving stretch of the conveyer in the elevator housing 25.

The path of travel of the conveyer 61 is completed by a pair of idler sprockets 67 located alongside the inner or opposing faces of the frame side bars or channels 31 immediately in rear of the upturned prow 36 of the bottom plate 33. These sprockets 67 provide a generally horizontal stretch of the conveyer 61 which, as best shown in FIGS. 2 and 8, extends tranversely between the side bars 31 and travels parallel with the bottom plate 33 from the front 36 to the rear 38 thereof. The pair of sprockets 67 can be supported in the manner shown in FIG. 9, where they are shown as keyed to a cross shaft 68 and held in spaced relation by a spacer tube 69. The shaft 68 is shown as journalled in bearings 70 secured to the forward ends of the side bars 31. To prevent sagging of the horizontal upper stretch of the conveyer 61, it and the corresponding parts of the drive chains 60 can be supported by a sheet metal pan 71 having upturned edges 72 secured to the frame side bars 31, as best shown in FIG. 8.

As best shown in FIG. 1, the pods and trash are supported for upward movement along the generally vertical elevator stretch of the conveyer 61 by an endless idler belt 76, the lower end of which passes around a transverse idler roller 78 journalled in the lower end of the elevator housing 25. The rear stretch of this idler belt 76 is in parallel, face-to-face, spaced relation to the corresponding stretch of the conveyer 61, so that bean pods and trash entering the space between these stretches are held in engagement with these stretches and conveyed upwardly to be discharged.

As best shown in FIGS. 2 and 3, a gear case 104 is mounted on each sidewall 30 of the base section 29 of the elevator by brackets 105, these brackets being connected by a cross tube 106. These gear cases journal a cross shaft 108 having a sprocket 109 fast to one projecting end. The sprocket 109 is connected by a chain 110, as shown in FIG. 1, with a sprocket 111 fast to the corresponding end of the jack shaft 26.

Within each gear case 104, the cross shaft 108 carries a bevel gear 112 which meshes with a bevel gear 113 fast to a longitudinal picker shaft 114. As best shown in FIG. 2, the picker shafts 114 are arranged outside of and above and generally parallel with the side bars 31 of the harvester frame. The rear ends of the picker shafts 114 extend from and are journalled in the corresponding gear cases 104, each of which supports a vertical rear end plate 116 forming part of the frame of the bean picker.

The forward end of each of the picker shafts 114 is journalled, as best shown in FIG. 3, in a bearing of a gear case 120. Each of these gear cases is secured to a front end plate 121 forming part of the frame of the bean picker.

Each of the rotary picking mechanisms designated generally at 119, operates on a single row of bean plants, and is provided with rod-like picking tines which enter the bean plants, sever the bean pods therefrom, and deposit the pods on the upper horizontal stretch of the conveyor 61. For this purpose each of the shafts 114 of each rotary picking mechanism 119 has a disk-like end head 122 fixed to each of its ends and these end heads are spaced from the front end plates 121 and support an annular series of angle irons 123 which are arranged parallel with and equidistant from the shaft 114 but terminate short of the rear end of the shaft 114. These angle irons are shown as being eight in number. These angle irons are arranged to have one face disposed generally radially with respect to the shaft 114 but with a slight backward rake, say, in the order of 10° from radial, and at their centers are shown as additionally supported from a disk 124, fast to the center of the shaft 114, by bars 125 fixed to the center of each angle iron and bolted to the disk 124. To each backward rake face of each angle iron 123 is secured, as hereinafter described, the base or attaching ear portions 126 of picking tines 127. These picking tines are each made of spring wire and the base or attaching end 126 is in the form of a loop adapted to be bolted to the angle iron 123 and each loop forms a continuation of one end of a helical coil spring 128 arranged parallel with the supporting angle iron 123. The opposite end of each helical coil is continued in the form of a projecting finger 129 which projects along the backward rake face of and a substantial distance from its angle iron 123 to enter the bean plants and thresh the pods therefrom.

The tines 127 are preferably spaced in regular order along each of the angle irons 123 and are secured to these angle irons by short bolts 130 which pass through the base or attaching loops 126 of these tines and through the angle irons 123 as best shown in FIG. 8.

The rear end of each rotary picking mechanism 119 is formed to sweep close to and parallel with the ground so as to recover pods that otherwise would be lost. For this purpose, the ends of the tines at the rear ends of each rotary picking mechanism 119 define a frustum of a cone the bottom part of the periphery of which is parallel with and close to the ground. For this purpose, the rearward ends of the several angle irons 123 are continued with angle irons 123a which converge rearwardly toward one another. The rearward ends of these angle irons 123a are suitably secured to the rear disk 122 of the shaft 114 and these angle irons jointly define a conical frustum the bottom longitudinal line of which is parallel with the ground.

Each of these converging angle irons 123a carries a series of picking tines 127a identical with and mounted in the same manner as the picking tines 127 on the angle irons 123 but since the angle irons 123a converge, the outer ends of the picking tines on the angle irons 123a also converge to form a conical frustum which sweeps close to the ground.

Such tine necessarily have V-shaped crotches 131, as best shown in FIG. 10, opposing the bushes being threshed and it was found that these crotches had a tendency for catching the branches of the bushes. In accordance with the present invention, this difficulty is eliminated and furthermore the bushes are smoothed into a mat or mass of uniform thickness for optimum threshing of the pods with minimum injury, by a series of rods 132 running lengthwise of each reel or rotary beater 119 and arranged behind the projecting finger 129 of each tine 127, these rods 132 being in outwardly spaced relation to each spring coil 128 so as to not only prevent access of the bush branches to the crotches 131 but also to hold these branches closer to the outboard ends of these projecting fingers 129, and to smooth them out into a mat or mass of uniform thickness. One rod 132 is arranged in contact with the leading sides of each row of projecting fingers 129, of the tines 127, including those forming the conical frustum at the rear end of each rotary picking mechanism 119. To this end, short bars 133 are welded at intervals to project transversely from each rod 132 and is provided at its outboard end with a hole 134. These bars are positioned to be secured by the same bolts 130 which secure the loops 126 of the corresponding tines 127.

An important feature of the present invention, and which is required to permit harvesting of the pods of baby lima beans and Fordhook beans for subsequent threshing in a viner, resides in the provision of rotary brushes 135 above and parallel with the reels or rotary picking mechanisms 119 and brushing the tines 127 on the rising sides thereof not only to sweep the projecting fingers 129 of these tines clean but also to enclose the top of the space between the picking reels to prevent the escape of bean pods over the tops of the picking reels. To this end each rotary brush comprises a hub 136 from which the bristles 138, preferably of nylon, project radially, these hubs having stub shafts 139 at the ends thereof. These stub shafts 139 can be journalled in bearings 140, 141 fixed to the rear and front vertical frame plate 116 and 121, respectively. The axis of each brush 135 is substantially parallel with the axis of the rotary reel 119 and is positioned so that its bristles interleave with the projecting fingers 129 of the tines 127 at the crest of the rising sides of the rotary reels or picking mechanisms 119.

The direction of rotation of each brush 135 is opposite to that of its reel 119 so that its downwardly moving bristles 138 move through the upwardly moving projecting fingers 129 to sweep any pods or branches entrained on the tines downwardly toward the conveyer belt 61.

It will also be seen that these rotary brushes 135 effectively block the escape of pods over the tops of the reels 119, this being especially important in harvesting baby lima beans or Fordhook beans the small pods of which fly around like pieces of paper. This can be accomplished by a sprocket 144 on the stub shaft 139 at one end of each brush 135 driven through a chain 145 from a sprocket 146 on the shaft 114 of the rotary picker 119, these sprockets preferably being in about a two to one ratio, that is, the angular speed of the brushes 135 is about twice that of the picking mechanisms 119.

The bean plants are preferably bent over while being acted upon by the picking tines 127 and for this purpose the opposing sides of the two rows of bean plants being harvested are held against and travel along a horizontally elongated abutment or mold board 151 secured to each of the frame side bars 31 along the picking zone. Each of the mold boards 151, as best shown in FIG. 8, has a vertical wall 152 arranged in spaced relation to a vertical plane intersecting the axis of its rotary picking mechanism 119 to permit the bean plants to pass therebetween. The vertical wall 152 terminates in a bottom inturned longitudinal flange 153 which is secured at intervals to the underside of the bottom plate 33 at the side edge thereof. The upper edge of the vertical wall 152 terminates in an arcuate concave wall 154 which forms a continuation of this vertical wall and extends inwardly therefrom in concentric relation with the picker shaft 114. This mold board 151 preferably extends the full length of the picking tines 127 and is formed so that these picking tines sweep in close relation to the concave parts 154 of these mold boards 151. The upper edge of each arcuate wall 154 terminates in a downwardly and inwardly inclined wall 155 which forms a continuation thereof and which extends over and houses the corresponding side chain 60 of the conveyor 61. The lower edge of each of these inclined walls 155 terminates in a flange 156 which rests on and is secured to the corresponding side bar 31 of the harvester frame. At intervals the mold boards 151 can be reinforced by internal transverse plates 158 welded at their tops and outer sides to the arcuate and vertical walls 154 and 152, respectively, and fitting in the channels of the side bars 31.

The mold boards 151 are not of uniform size in cross section, but diminish toward the rear of the harvester to conform to the upward and forward inclination of the picker shafts 114 and the picking tines 127 carried thereby and also conform to the frusto-conical form of these tines at the rear end of the harvester.

The bean plants of each row are gathered at each side of the harvester by a pair of gathering aprons indicated generally at 160. As best shown in FIGS. 5 and 7, each gathering apron 160 comprises a bar 161 which is L-shaped in cross section, having an upstanding guide flange 162 along its edge remote from the row of beans. Bolted, as at 163, to the underside of this bar along the edge thereof adjacent the row of bean plants is a lower apron 164, this lower apron having an upper attaching flange 165 through which bolts 163 extend. The lower apron 164 is in the form of a vertical flat plate that diminishes in height toward its front end to form a forward pointed end 166, as best shown in FIG. 3.

Secured by the same bolts 163 to the bar 161 is an angle iron 168 to the upper part of which, on the side facing the bean plants, is secured a spacing strip 169 to form a guideway 170 extending longitudinally of the bar 161. Secured to the inner face of the spacing strip 169 is an upper apron 171 which has a planar vertical part 172 extending upwardly from the spacing strip 169 and an upper outwardly curving edge 173 which supports the branches of the bean plants. As best shown in FIGS. 1 and 2, this curving edge 173 extends abruptly upwardly and rearwardly from the pointed forward extremity 166 of the gathering apron, this upper curving edge thereby serving to elevate sprawling branches of the bean plants and bring the bean plants to an erect position.

As best shown in FIG. 7, the rear end of each of the bars 161 rests on and is suitably secured to the forwardly extending tongue or extension 174 of a supporting bracket 175. As best shown in FIG. 4, the bracket 175 is L-shaped in cross section, having a base flange forming a continuation of the bar 161 and an upstanding flange 176 on the side thereof remote from the bean plants. The upstanding flange 176 of each bracket 175 has a bearing 177 journalled on a corresponding cross shaft 178. Each cross shaft 178 is in turn journalled in a bearing 179 of a bracket 180 attached to the front face of the front stationary disk 121 of the housing for the corresponding picking mechanism. It will therefore be seen that the gathering aprons 160 of each pair are pivotally mounted at their rear ends on the cross shaft 178 so that their front ends are free to rise and fall. The space between the pair of gathering aprons 160 at each side of the machine alines, of course, with the space between the corresponding mold board 151 and the corresponding rotary picking mechanism 119, so that the bean plants gathered by the gathering aprons 160 are led with their branches raised into these spaces.

The lifting of the branches of the bean plants between each pair of gathering aprons is facilitated by chains 181, the bean plant engaging stretch of each of which passes along the guideways 170 formed by the spacer bars 169, and the other stretch of which rides on the L-shaped bar 161 adjacent the upstanding flange 162 thereof. At its lower end each of these chains 181 passes around an idler sprocket 182 mounted on the lower end of the corresponding bar 161, while the upper end of each of these chains passes around a drive sprocket 183 journalled on an upstanding pin 184 on the base flange of the bracket 175. Each gathering chain is preferably provided with suitable knobs 185 to insure gathering of the branches of the bean plants.

As best shown in FIGS. 3 and 4, each sprocket 183 is formed integrally with a miter gear 186 which meshes with a miter gear 188 fast to the cross shaft 178 which serves the pair of chains 181 at each side of the harvester. A sprocket 191 is fast to the outer end of each cross shaft 178, this being connected by a drive chain 192 with a sprocket 193 fast to the outer end of a cross shaft 194. As best shown in FIG. 3, each of the cross shafts 194 is journalled in a gear box 120. Inside of each gear box 120, a miter gear 198 is fast to the cross shaft 194 and meshes with a miter gear 199 fast to the end of the corresponding picker shaft 114.

Each apron 160 is provided with a ground-engaging shoe or skid 200, best shown in FIGS. 2 and 6, which serves to support the apron and also permits it to follow the contour of the ground. Each skid 200 extends lengthwise of the apron and is provided with upturned front and rear ends. At its forward end, each of these shoes is jointedly connected with the pin 201 on which the front idler sprocket 182 of the corresponding gathering chain 181 is mounted. As shown in FIG. 6, the pin 201 is provided at its lower end with a pair of downwardly projecting ears 202 between which is pivoted, as by a cross pin 203, the front end of a rearwardly projecting rod 204. As shown in FIG. 2, each rod 204 extends through a horizontal sleeve 205 fast to the forward end of the corresponding shoe 200. It will be seen that the forward end of each shoe 200 is free to pivot about its horizontal pivot pin 203 and also free to slide fore-and-aft along its rod 204. The rear of each shoe 200 is provided with a transverse pivot pin 206 to which an arm 208 is pivotally connected. On the rear end of the arm 208 is rigidly mounted an upstanding rod 209. The rod 209 slides in a vertical sleeve 210 at the forward end of a frame bracket 211 secured to the vertical front frame plate 121 as best shown in FIG. 1. The upper end of each upstanding rod 209 is provided with a series of transverse holes 212 through which a retaining pin can be passed to limit the downward movement of the rod, each of these rods 209, and hence the rear end of each shoe 200, being free to move upwardly.

*Power flow*

The power flow from the power take-off 17 of the tractor T to the various rotating components of the harvester is as follows:

The shaft 18 of the power take-off (FIG. 1) through the chain 27 drives the jack shaft 26 journalled in the elevator housing 25 forming part of the adjustable frame of the harvester. Through the sprocket 111, chain 110 and sprocket 109, this jack shaft drives the cross shaft 108. Through the two sets of miter gears 112 and 113 (FIG. 3), the cross shaft 108 drives each of the picker shafts 114 which extend forwardly along opposite sides of the tractor. The picker shafts 114 rotate the picking mechanisms 119 so as to rotate the picking tines 127 in the directions indicated by the large arrows shown in FIG. 8.

Through the miter gears 199 and 198 in each of the gear cases 120 (FIG. 2) the rotation of the picker shafts 114 rotates each of the short cross shafts 194. Through the sprockets 193 and chains 192, the shafts 194 drive the sprockets 191 (FIG. 4) on each of the short cross shafts 178. Through the miter gears 188 and 186, each of the cross shafts 178 drives the corresponding pair of sprockets 183 which mesh with the corresponding gathering chains 181. One of these gathering chains 181 is associated with each of the four gathering aprons 160, the lower ends of these chains passing around the sprockets 182 (FIGS. 2 and 6), and the knobs 185 on these chains traveling upwardly and rearwardly along the opposite sides of these gathering aprons (FIGS. 2 and 3) to assist these gathering aprons in lifting the branches of the bean plant.

The bean pods and trash deposited on the horizontal upper stretch of the conveyer 61 are carried upward by the elevating stretch into engagement with the rear stretch of the idler belt 76 and thus drive this stretch of the idler belt upwardly. The idler belt 76 travels around the roller 78. The idler belt 76 and elevating stretch of the conveyer 61 can deliver the pods, as well as any leaves, stems and trash mixed therewith, to a suitable cleaning and bagging or boxing mechanism, such forming no part of the present invention and thence not being shown.

The rotation of the shafts 114 of the rotary picking mechanisms 119, through the sprockets 146, chains 145 and sprockets 144, drive the rotary brushes 135. These rotary brushes desirably are driven about twice the angular speed of the picking mechanisms and in an opposite direction so that the downwardly moving bristles 138 of these rotary brushes 135 sweep through the upwardly moving fingers 129 of the tines 127 of the rotary picking mechanisms.

*Operation*

The tractor T with the harvester forming the subject of the present invention attached thereto is propelled along the two rows of bean plants to be harvested, the centerlines of these rows being designated by the letter C. As best shown in FIG. 3, the tractor T is guided so that these two rows of beans aline with the spaces between the two pairs of gathering aprons 160 at each side of the harvester, which aprons are pivoted at their rear ends on the cross shafts 178 (FIGS. 2, 4 and 7) and are supported at their front ends by the ground-engaging shoes 200 (FIG. 2). Referring to FIGS. 1 and 2, it will be seen that the upper parts 173 of each pair of these aprons curl outwardly away from the row of beans received therebetween and that these curving parts are arranged at a steep angle, sloping downwardly and forwardly toward the pointed ends of these aprons which travel close to the ground. Accordingly, these pointed forward ends of the aprons move close to the ground under the prostrate branches of the bean plants, and as the aprons travel forwardly these branches are lifted so as to bring each bean plant to an erect position.

In order to hold the bean plants in such erect position while traveling rearwardly between the pairs of aprons 160, and to overcome the friction of these aprons in so lifting the branches of the bean plants, the pairs of gathering chains 181 are associated with these aprons, these chains being arranged at the angle indicated at FIG. 2 and each having its operative stretch traveling in the guideway 170 (FIG. 5) provided in each of these gathering aprons, each chain being provided with the knobs 185 which project from the face of the apron along which the bean plants travel so as to interengage with the bean plants and positively propel them along the aprons. These operative stretches of the gathering chains 181 travel upwardly and rearwardly and are synchronized with the rate of travel of the tractor so as, in effect, to remain stationary and not pull the bean plants from the ground nor retard their progress along the gathering aprons 160.

The gathering chains 181 continue to hold the bean plants during their rearward movement between the corresponding pair of gathering aprons 160, and deliver the bean plants under the forward stationary frame plate 121 and the front end of the corresponding picking mechanism 119 and into the space (FIG. 8) between its tines 127 and the adjacent mold board 151. On moving into this space, the bean plants enter the zone of action of the picking tines 127, which are rotating about the axis of the corresponding picker shaft 114 in the direction of the arrows associated with FIG. 8.

The picking tines 127 move upwardly within the bean plants, strike the stems which connect the pods with the bean plants, and operate to sever the bean pods and fling them onto the surface of the stretch of the conveyer 61, which serves both of the picking mechanisms 119. In the event that a picking tine 127 encounters excessive resistance in so combing the bean plants, the picking tines are capable of yielding due to their helical spring sections 128, as above described. The bean pods, together with the leaves and other material necessarily separated from the bean plants, are carried by the horizontal stretch of conveyer 61 to the elevator stretch and thence to a winnowing and bagging mechanism (not shown).

A feature of the invention, however, resides in maintaining the bushes being threshed at the outer ends only of the picking fingers 129 of the tines 127. This is accomplished by the rods 132 extending parallel with the axis of each rotary picking mechanism 119 and held against or releasably touching the advancing side of a corresponding row of projecting fingers 129 of these tines. These axially extending rods 132 are held in this position by their laterally extending bars 133 secured to the bars 123 by the same bolts 130 which secure the tines and it will be observed that these rods 132 (1) do not interfere with the yielding of the projecting fingers 129 on encountering an immobile object (2) prevent the bean stems or branches from being caught in the crotches 131 between the coils 128 and projecting fingers 129 of the tines 127 and (3) also serve to gather the bean plants into a mat of uniform thickness for improved threshing by the projecting fingers 129.

At different times, it is necessary to adjust the front end of the harvester frame. To effect such adjustment, the operator moves the hydraulic control lever L' (FIG. 1) to swing the levers 14 in one direction or the other. On swinging clockwise, as viewed in FIG. 1, these levers 14, through the push rods 50, operate to swing the triangular plates 45 clockwise about their pivots 46 and, through the links 44, to lift the front end of the harvester frame.

It is also desirable to be able to adjust the rear end of the harvester frame so as to adjust the height of the rear ends of the picking mechanisms 119. To effect such adjustment, the operator moves the hydraulic control lever L (FIG. 1) to swing the levers 13 in one direction or the other. On swinging clockwise, as viewed in FIG. 1, the levers 13, through the chains 21, swing the bell crank levers 19 clockwise and thereby elevate the rear end of the harvester frame.

An important feature of the invention resides in its improved performance in reduction of bruised and broken bean pods, this being important with all types of beans at all times but particularly when the pods are chilled, as on a cold morning. This feature also enables the harvesting of the very small and light pods of baby lima beans and Fordhook beans, the pods of which fly around like pieces of paper. This feature comprises the rotary brushes 135 having nylon bristles 138, these bristles interleaving with the crest of the rising tines 127 of the two rotary picking mechanisms 119 and moving downwardly through these tines to free them from pods and parts of bushes. These rotary brushes 135 are not only gentle in their tine-cleaning action but also form a rotary barrier above each rotary picking mechanism 119, toward the center of the machine, and which, as best shown in FIG. 8, tends to confine the light bean pods, flying around, to the zone above the belt 61, to settle thereon and be carried out as a product with minimum bruising and breakage.

From the foregoing it will be seen that the present invention provides a sturdy and reliable harvester, which obtains high yield from bean plants in the field with minimum loss of and injury to the bean pods and operates rapidly and effectively to harvest bean pods, including baby limas and Fordhook beans from which the seed is subsequently threshed. It will further be seen that the present investion accomplishes the objects and has the advantages heretofore enumerated.

What is claimed is:

1. In a snap bean harvester having a frame adapted to be propelled along a row of bean plants in the field, a threshing reel journalled on said frame to rotate about an axis arranged above and extending longitudinally of said row, picking fingers projecting in a generally radial direction from said reel to engage and comb said bean plants in said row, means rotating said reel to effect upward movement of said picking fingers through said plants and a conveyer arranged on the upwardly moving side of said reel to receive the bean pods, leaves and stems removed from said bean plants by said upwardly moving picking fingers; the combination therewith of means retaining the bean plants as a mat of uniform thickness toward the outer ends of said picking fingers, comprising an annular series of rods secured to said reel to extend lengthwise of and generally concentric with its axis, said rods being held intermediate the length of said picking fingers and releasably touching the advancing sides of said spring fingers thereby to avoid interference with the individual spring action of the picking fingers on encountering an immobile object.

2. The combination set forth in claim 1 wherein said reel includes an annular series of bars fixed to one another to extend lengthwise of and generally concentric with the axis of said reel, wherein said picking fingers each includes a helical spring base from one end of which the picking finger forms an integral extension, said helical spring bases extending lengthwise of said reel axis and including means attaching them to said bars, and means securing said rods to said bars.

3. In a snap bean harvester having a frame adapted to be propelled along two rows of bean plants in the field, a conveyer mounted on said frame to travel between said rows of bean plants near the bases thereof, a pair of threshing reels arranged to travel on the sides of said rows opposite from said conveyer and each journalled on said frame to rotate about an axis arranged above and extending longitudinally of the corresponding row of bean plants and including picking fingers projecting in a generally radial direction from its axis to engage and comb the plants in said corresponding row, and means rotating each of said reels to effect movement of its depending fingers toward said conveyer and thence upwardly through the corresponding row of plants; the combination therewith of means retarding the escape of pods over said reels and cleaning said picking fingers, comprising a pair of rotary brushes each journaled on said frame above and on an axis generally parallel with the axis of a corresponding reel and having radially projecting bristles interleaving with the crest of the rising picking fingers on said corresponding reel, and means rotating each of said rotary brushes about its axis to move its interleaved bristles toward the center of the harvester in opposition to the direction of movement of the interleaved picking fingers whereby a confining trough is provided above said conveyer the lower side parts of which comprise the rising picking fingers of said pair of reels and the upper side parts of which comprise the rising bristles of said pair of brushes, said trough being particularly effective to confine pods which tend to fly around to the area above said conveyer to settle thereon.

4. The combination set forth in claim 3 wherein the axes of said brushes are closer together than the axes of said reels to restrict the width of the upper part of said trough.

References Cited in the file of this patent

UNITED STATES PATENTS

| 1,429,168 | Scott | Sept. 12, 1922 |
| 1,798,883 | Hunter et al. | Mar. 31, 1931 |
| 2,451,130 | Townsend | Oct. 12, 1948 |
| 2,675,663 | Ward | Apr. 20, 1954 |

FOREIGN PATENTS

| 150,549 | Australia | Mar. 18, 1953 |